FIP3212 XR 2,794,605
CROSS REFERENCE SEARCH ROOM

June 4, 1957 J. B. MINTER 2ND 2,794,605

MAGNETIC TAPE TRANSDUCER MECHANISM

Filed Feb. 5, 1954 2 Sheets-Sheet 1

INVENTOR.
JERRY B. MINTER, 2ND
BY John J. Rogan
ATTORNEY

June 4, 1957 J. B. MINTER 2ND 2,794,605

MAGNETIC TAPE TRANSDUCER MECHANISM

Filed Feb. 5, 1954 2 Sheets-Sheet 2

INVENTOR.
JERRY B. MINTER, 2ND
BY John J. Rogan
ATTORNEY.

United States Patent Office 2,794,605

Patented June 4, 1957

2,794,605

MAGNETIC TAPE TRANSDUCER MECHANISM

Jerry B. Minter 2nd, Boonton, N. J.

Application February 5, 1954, Serial No. 408,389

8 Claims. (Cl. 242—55.11)

This invention relates to the art of high-speed winding of webs, ribbons, and the like, and in particular it relates to machines and devices for recording and/or reproducing signals on a magnetizable web or tape.

A principal object of the invention is to provide a novel stabilizer for the high-speed rewind mechanism of so-called magnetic tape recorders or play-back units.

Another object is to provide an improved reeling mechanism for electro-transducer tapes.

The art of recording and reproducing intelligence signals on tapes has reached a high degree of development, yet there are certain problems which are peculiar to that art as distinguished from the reeling and tape winding arts generally. For example, in ordinary reeling machines, even when operated at high speed, it is relatively unimportant that the successive layers or turns of the reeled tape be in perfectly aligned superposition so long as the said layers are wound with uniform tension. However, in the art of recording and reproducing electric signals on magnetized tape and the like, in conjunction with the present day high fidelity amplifier and reproducer apparatus, any variations, even of extreme slightness in the lay of the tape and the reel may appear as a disturbance in the reproduced signal output.

I have found that one of the causes of these resultant disturbances in the final reproduced signal is the tendency of the reeling mechanism to subject the reel to an undesired vibration which tends to be cumulative. In other words, the reel does not rotate in a perfectly true planar rotation in a plane perpendicular to the driving shaft but on the contrary is subjected to lateral vibration and to a bouncing action which result in undesirable skewing of the tape. This skewing is further aggravated by the tendency of the reel, which is relatively non-massive, to vibrate or skew at its own natural period of vibration. This skewing or bouncing action is of pronounced disadvantage where the tape is reeled at very high speed. In order to prevent binding between the tape edges and the walls or flanges of the reel, the reel must be designed with the interflange spaces wider than the tape. Therefore, if the reel is subjected to planar skewed rotation or bouncing, the successive turns of the tape will be superposed in different lateral positions. Consequently, when the tape is run at lower speed through a reproducing or play-back mechanism, these irregular lateral displacements of the superposed tape turns, produce disturbances which cannot be filtered out electrically or acoustically.

The disturbances caused by the skewed reeling of the tape become even more pronounced as the tape ages. The present conventional plastic tapes tend to become brittle after a period of time and if the tape is wound in distorted overlay the distortion in the tape tends to assume a permanent set. Furthermore, the larger the reel and the larger the number of tape turns, the greater the likelihood of the outer turns being distorted. In certain cases it has been found that the tape may be sufficiently distorted from its flat position so as to prevent it riding on the play-back or recording head in perfectly flat form. If unusually strong pressure shoes are used to force the tape flat against the head, there result excessive wear and eventual ruining of the tape.

The present invention, therefore, has for another of its principal objects a stabilizing arrangement for the high-speed reeling of magnetized or similar record tape, and wherein the successive turns of the reeled tape are wound in substantially uniform superposed array.

A feature of the invention relates to a rotary stabilizer for use with high-speed tape reeling devices so as to overcome the tendency of the reel to vibrate or bounce and thereby to avoid skewing of the tape as it is being wound.

Another feature relates to an improved vibration damper for high-speed tape reeling machines.

A further feature relates to a vibration damping unit for attachment to the winding capstan of a high-speed magnetic tape recording or play-back machine, whereby the successive tape turns are reeled in substantially uniform overlay.

A still further feature relates to a vibration damper for high-speed rewinding of magnetic record tape, which stabilizer comprises a spring-mounted mass which can move radially in relation to the winding reel axis as distinguished from a rotational inertia fly wheel, and in conjunction with a frictional damper member, whereby the tendency of the winding reel to execute cumulative skewing or bouncing vibration is avoided.

A still further feature relates to the novel organization, arrangement, and relative location and interconnection of parts which cooperate to provide an improved recorder or play-back unit for magnetic record tapes, and the like.

Other features and advantages, not particularly enumerated, will be apparent after a consideration of the following detailed descriptions taken in conjunction with the accompanying drawings and the appended claims.

In the drawing, which shows by way of example one typical embodiment,

Figure 5:
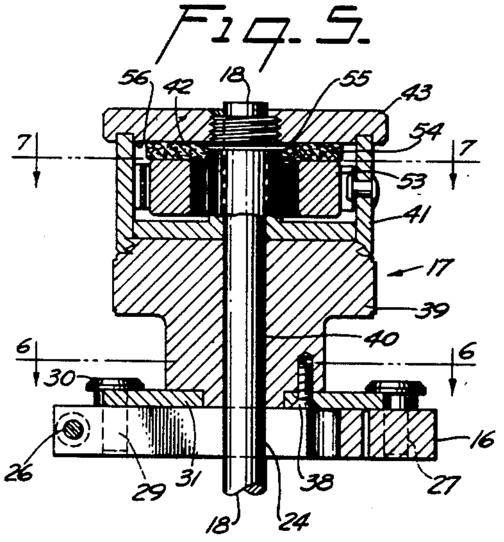
Fig. 5 is a sectional view of Fig. 4, taken along line 5—5 thereof.
Figure 6:
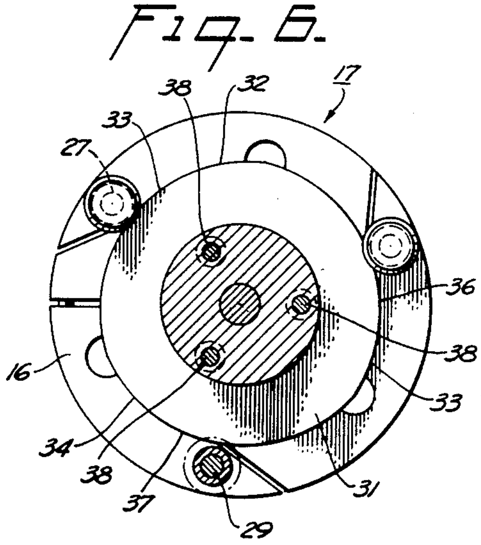
Figure 7:
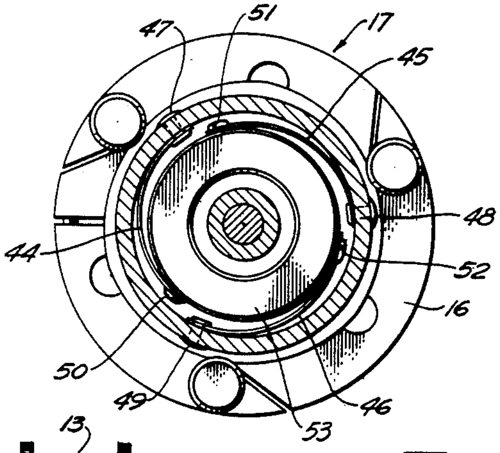
Figure 8:
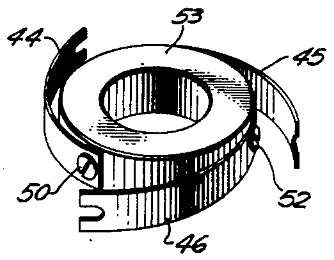
Figure 10:
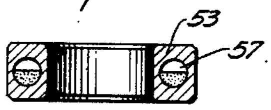
Figures 9, 11:
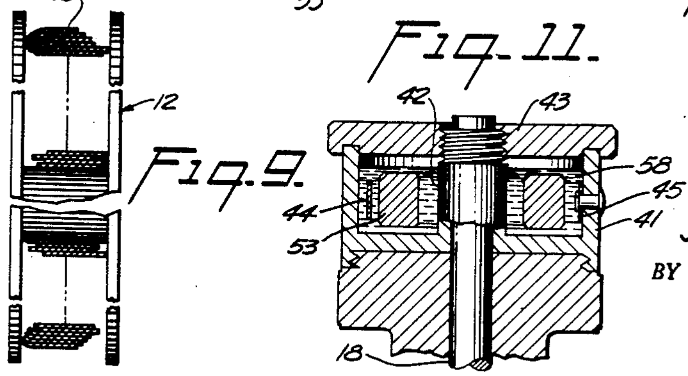

Figs. 6 and 7 are sectional views taken respectively along the lines 6—6 and 7—7 of Fig. 5;

Fig. 8 is a perspective view of one of the stabilizing spring-mounted masses of Figs. 3 to 7;

Fig. 9 is a diagrammatic view used in explaining the invention;

Figs. 10 and 11 are views of respective modifications of the damping means.

Figure 1:
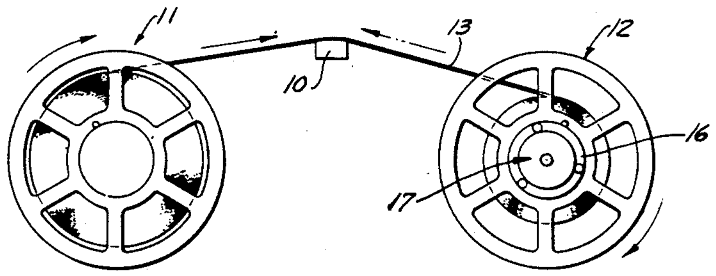
Fig. 1 is a generalized schematic plan view of certain parts of a magnetic tape recorder or play-back machine embodying the invention.
Figure 3:
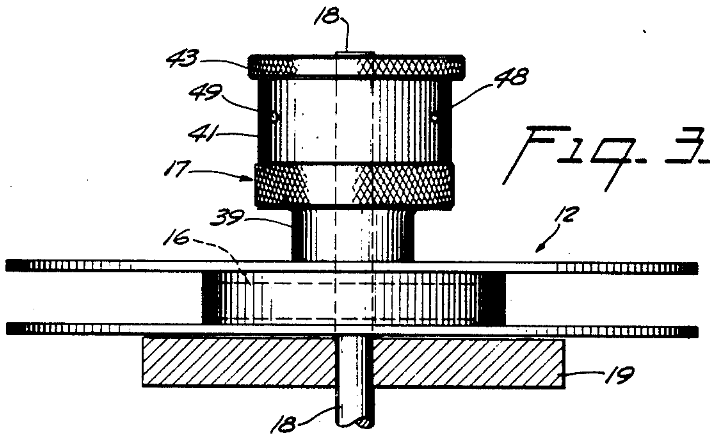
Fig. 3 is an elevational view of part of Fig. 1.
Figure 4:
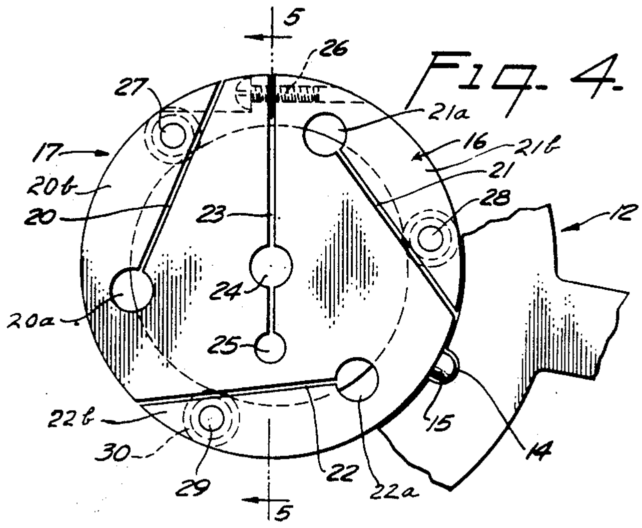
Fig. 4 is an enlarged bottom view of part of Fig. 3.

Referring to Fig. 1, the numeral 10 represents in diagrammatic form the recording and/or play-back head such as is conventionally used in magnetic tape recorders and the like. This head is usually mounted between a pair of reels 11 and 12. Associated with the head 10 on opposite sides thereof are the usual tape guides and pressure shoes (not shown) for holding the moving tape against the head 10. The reel 11, for example, may be the reel to receive the tape 13 as it is being recorded, and the reel 12 may be a rewind reel upon which the recorded tape can be rewound at very high speed. The tape 13 may be of any material well known in the magnetic recording art. For example, it may be a paper or plastic tape which carries the well known magnetic coating or pigment which is capable of cooperation with the head 10 to record or play-back the signals. It will be assumed that the dotted-line arrow adjacent tape 13 in Fig. 1 represents the direction of the tape movement for recording or play-back, while the full-line arrow represents the direction of movement of the tape when it is being rewound at high speed from the reel 11 on to the reel 12. The movement of the tape during the recording or play-back is at relatively low speed, for example 15 inches per second. On the other hand, during the rewind operation on to the reel 12 it is desirable to effect the rewinding at extremely high speed for various reasons. For example, during this rewinding the reel 12 may be driven at the rate of 1800 R. P. M. to rewind at the rate of 300 inches per second. Reels 11 and 12 may be of as much as 10 or 12 inches in outside diameter and are usually constructed of plastic, aluminum, or other light-weight material. In order to achieve ease of loading a reel on to the machine, the reel is usually provided with one or more notches 14 (see Fig. 4) which register with one or more pins 15 on the rotary driving elements, for example on base 16 of the rotatable stabilizer unit 17, according to the invention. The unit 17 is arranged to be fastened to the motor driven shaft 18 which may also carry a flat plate 19 on which the reel 12 rests as it rotates.

Figure 2:
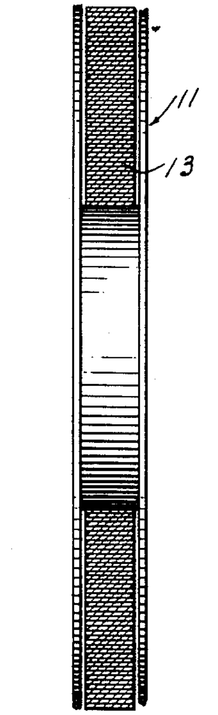
Fig. 2 is an edge view of a reel or spool with the tape wound thereon in ideal uniform overlay.

It is highly desirable, and in high fidelity systems it is necessary, that the successive layers of the wound tape on the reel be in symmetrical superposed array as shown in the magnified view of Fig. 2. If, for any reason, the tape layers are wound in non-symmetrical overlay, as indicated in the magnified partial view of Fig. 9, then when the tape is unreeled from reel 12 to reel 11 for recording or play-back, it will be subjected to a skewing action which will result in a disturbance in the reproduced signal. Furthermore, the non-symmetrical overlay may even cause mechanical distortion of the tape at its edges. This non-symmetrical overlay, I have found, is greatly aggravated by the tendency of the reel 12 to vibrate bodily in the nature of a chatter or bounce on the support 19 as it is being rotated at very high speed. In fact, I have found that at these high rewinding speeds the reel may vibrate at a quasi-resonant rate determined by its own mass and the weight distribution of the wound tape thereon. This chattering or bouncing effect during the high-speed rewind can also occur because of the fact that the usual commercial reels are not machined to great accuracy and concentricity. Furthermore, in order to expedite loading, a certain amount of clearance is required between the notches 14 and the coupling pins 15. Consequently, when the reel is loaded on to the machine there is no assurance that it is perfectly concentric with the axis of rotation of the main driven shaft 18. Furthermore, this shaft 18, being usually of steel, exhibits substantial whip when the mechanism is driven at high speed. This whipping action of shaft 18 also tends to cause vibration of the reel and the action is a cumulative one.

In order to overcome the above noted undesirable vibrations during high speed rewind, there is provided the stabilizing unit 17 according to the invention. This unit is arranged to be mounted in concentric relation above the reel 12, and it may comprise a round base member 16 which can be rigidly fastened concentrically to the shaft 18 in any suitable way, and is preferably in the form of an expansible chuck. Thus, the member 16 is cut with three symmetrically arranged slits 20, 21, 22 and a radial slit 23. A central bore 24 of the same diameter as shaft 18 is provided and also an additional off-center bore 25. The base 16 is fastened to shaft 18 for example by a tightening screw 26 which is threaded through the sections of the base on opposite sides of the slit 23. The slits 20, 21, 22 thus, by reason of the circular holes **20*a*, 21*a*, 22*a*, provide the base with three radially expansible sections 20*b*, 21*b*, 22*b*. The slit 23 in conjunction with bore 25 permits the shaft-receiving bore 24 to be expanded or contracted by screw 26**.

For the purpose of uniformly and radially expanding member 16 to fit the inside circumference of the reel hub, there are fastened in the base 16 and equally spaced from each other three round posts 27, 28, 29, each having a flanged head 30 to define a three-point guide and retainer for a three lobe cam plate 31. Plate 31 has its edge provided with three raised cam sections 32, 33, 34 which at their highest portion tightly fit against the respective posts 27, 28, 29 to expand the circumference of base 16. The "low" camming surface portions 35, 36, 37 on the edge of plate 31, when in registry with the respective posts 27, 28, and 29, permit a circumferential contraction of base 16. I have found that the ordinary reel retaining device which usually employs a single radially movable element to hold the reel, while it may serve to hold the reel against bodily sliding movement, nevertheless because of any inherent eccentricity in the reel hub that prior method of fastening may accentuate the unbalance effect when the reel is rotating at high speeds.

Fastened to the plate 31 by three screws 38 is a metal casting 39 having a bore 40 of the same diameter as bore 24. Rigidly attached to the member 39 is a cup-shaped metal member 41 having a central concentric hollow tubular boss 42 whose upper end extends beyond the cylindrical wall of member 41 and is threaded to receive the pressure adjusting cap 43. If desired, member 41 may be integrally formed with member 39, although for ease of assembly member 41 may be threaded to member 39 as shown in Fig. 5.

Mounted internally of member 41 are three leaf springs 44, 45, 46 by respective screws or rivets 47, 48, 49. These springs are flexible in a direction transverse to the axis of shaft 18 but are rigid in a direction parallel to that axis. Each spring is preferably in the form of a curved arc of smaller curvature than the internal curvature of member 41; and each spring is fastened by a respective screw or rivet 50, 51, 52 to the outer periphery of an annular mass member 53. Member 53 has an inner diameter substantially larger than the outer diameter of boss 42, to permit a substantial lateral shifting of member 53 as it is rotating. Likewise, the outer diameter of member 53 is substantially less than the inner diameter of member 41 to accommodate the free lateral shifting of member 53. However, member 53 has a cross section which imparts a substantial mass thereto.

With the foregoing described construction, members 53 is mechanically coupled to rotate as a unit with boss 16 and shaft 18 and is normally concentric therewith. However, member 53 is capable of shifting laterally in a plane transverse to shaft 18. Because of the mass of member 53 during the high speed rewinding of tape 13 on to reel 12, member 53 acts as a stabilizer to prevent cumulative vibration of the reel 12 and also to prevent cumulative whipping of shaft 18. This whipping action, in the absence of member 53, would initiate or aggravate the tendency of reel 12 to bounce or chatter as it is rotating, and it also acts as a dynamic stabilizer to overcome any undesired eccentricity between the reel 12 and the shaft 18.

As pointed out hereinabove, when the bouncing and chattering of the reel 12 begins, because of the natural resonance of the reel at the high speed of rewinding, the chattering tends to become cumulative. I have found that this tendency to resonant chattering can be avoided or greatly reduced by subjecting the member 53 to a frictional drag in a plane transverse to the axis of rotation. For this purpose a felt or other similar frictional surfaced washer 54 is held with an adjustable light pressure against the top surface of member 53. In order to be able to adjust the magnitude of this frictional damping force, the felt washer 54 can be held in place by a thin metal washer 55 which is threaded on to the end of boss 42. Washer 54 is of sufficient thickness so that it can be adjustably compressed between the flat face 56 and the top surface of member 53 merely by turning the member 43 in one direction or the other, depending upon the amount of frictional damping required.

I have found that by adjusting the pressure on the felt washer by means of member 43, just the right amount of frictional damping force can be applied to the member 53 as the latter is rotating, so as rapidly to stabilize the lateral off-center vibration of member 53 with respect to the axis of rotation of shaft 18. In the absence of this frictional damping means, the member 53 will oscillate in a plane transverse to the axis of rotation of shaft 18 for a substantial period and merely modifies the vibration of the reel assembly. Without the proper damping the reel 12 may assume its resonant chattering with consequent non-symmetrical overlay of the tape turns. However, with the frictional damping means as described, the member 53 is relatively rapidly brought to its equilibrium balancing position without any excessive oscillation. Therefore, by proportioning the mass of the member 53 and the flexibility of the springs 44, 45, 46, and the pressure on the felt washer 54, the shaft 18 can be subjected to critical damping in such a short period of time as to prevent the normal whipping of the shaft from resulting in cumulative vibration or bounce of reel 12.

While one particular embodiment has been described and illustrated, it will be understood that various changes and modifications may be made therein without departing from the spirit and scope of the invention. For example, instead of using the particular frictional damping means in the form of a felt washer, other damping means may be employed. Thus, as shown in Fig. 10, the annular mass 53 may have an internal cavity 57 which may be partially filled with a comminuted frictional material such as sand to provide the desired critical damping on the lateral vibration of member 53. If desired, the cup member 41 can have a filling 58 of a suitable viscous liquid in which the member 53 is immersed to provide the requisite damping.

What is claimed is:

1. In a reeling machine of the kind described, a magnetic tape, a tape-receiving reel arranged to be rotated at a smoothly varying rotational speed in accordance with the number of tape turns reeled thereon, a driving shaft for rotating said reel at high winding speed said shaft having a substantially free end which is subject to whip action as it rotates, means supporting said reel substantially concentric with said shaft at said free end, and a vibration stabilizer unit comprising a base member concentrically fastened to said shaft, means to couple said reel to said base member for driving rotation, an extension from said base member extending a substantial distance beyond said reel and rotatable as a substantially rigid unit with said shaft, an annular mass surrounding said shaft, means for flexibly supporting said mass from said extension to cause said mass to rotate as a rigid unit with said base but permitting said mass to shift bodily in a direction substantially entirely radial to said shaft, and frictional damping means engaging said mass for the purpose described.

2. A machine according to claim 1, in which said extension includes a cylindrical chamber coupled to said base, said mass being supported by said flexible supporting means inside said cylindrical chamber, said cylindrical chamber having a central hollow boss to which said mass member is attached by said flexible supporting means, and a cap member adjustably threaded on to said cylindrical chamber and engaging said frictional damping means to adjust the amount of said frictional damping.

3. A vibration stabilizer unit for magnetic tape record machines, comprising a base member concentrically fastened to a driving shaft of said machine which shaft has an end which is subject to whip action during rotation, another member attached to said base member, said other member having a cylindrical chamber fastened to said base member for unitary rotation therewith and within which is mounted an annular mass, a plurality of leaf springs supporting said mass from the wall of said chamber to permit said mass to vibrate only in a direction radial to said shaft, a friction washer in contact with one face of said mass, and an adjustable pressure cap for said chamber for controlling the frictional pressure of said washer on said mass to damp said whip action of said shaft.

4. A reeling device of the kind described for reeling a web on a winding hub arranged to be driven at a smoothly continuous but varying rotational speed to provide a uniform linear speed of the web past a reference point, a power driven rotary shaft for supporting said winding hub for rotation, said shaft having a substantially free end which is subject to whipping action and to which said winding hub is coupled, means to control substantially uniform overlay of successive turns of the web on said hub, the last-mentioned means including a mass continuously rotatable at the same angular rotational speed of the shaft, means coupling said mass to said shaft to cause the center of gravity of said mass to be shifted substantially wholly in a radial direction away from the axis of shaft rotation for dynamic balancing during reeling of the rotating assembly comprising the hub and reeled web thereon, and means for damping the said shifting of said mass and thereby damping the whipping action of the shaft.

5. A reeling device according to claim 4, in which the coupling means includes a plurality of spring supports for said mass, said supports being flexible mainly in a direction radial to said shaft.

6. A reeling device according to claim 4, in which said mass is annular and has an internal cavity, and said damping means includes a comminuted frictional material partially filling said cavity.

7. A reeling device according to claim 4, in which said coupling means includes a plurality of leaf springs having their inner ends fastened symmetrically around the said mass, the opposite ends of said springs being anchored to another member surrounding said mass and coupled to said shaft to rotate in unison therewith, each of said springs being flexible mainly in a direction radial to said shaft.

8. A reeling device according to claim 4, in which said mass is symmetrically coupled to said shaft by a plurality of springs which have their flexibility mainly in a radial direction with respect to said shaft, and said damping means is a frictional damper and with the flexibility of said springs correlated with said frictional damping to subject said mass to critical damping.

References Cited in the file of this patent

UNITED STATES PATENTS

| | | |
|---|---|---|
| 1,743,776 | Hollnagel | Jan. 14, 1930 |
| 1,968,438 | Elmer | July 31, 1934 |
| 1,985,031 | Hanna | Dec. 18, 1934 |
| 2,002,561 | Wike | May 28, 1935 |
| 2,013,109 | Reynolds | Sept. 3, 1935 |
| 2,031,756 | Boecking | Feb. 25, 1936 |
| 2,094,095 | Collins | Sept. 28, 1937 |
| 2,108,426 | Begun | Feb. 15, 1938 |
| 2,112,894 | Hasbrouck, Jr. | Apr. 5, 1938 |
| 2,113,256 | Jeanne | Apr. 5, 1938 |
| 2,454,980 | Sobell | Nov. 30, 1948 |
| 2,568,539 | Briskin et al. | Sept. 18, 1951 |